July 10, 1928.
B. F. PAGENHART
1,677,047
BRAKE MECHANISM FOR TRACTION DEVICES OF THE ENDLESS BELT TYPE
Filed July 16, 1926
3 Sheets-Sheet 1
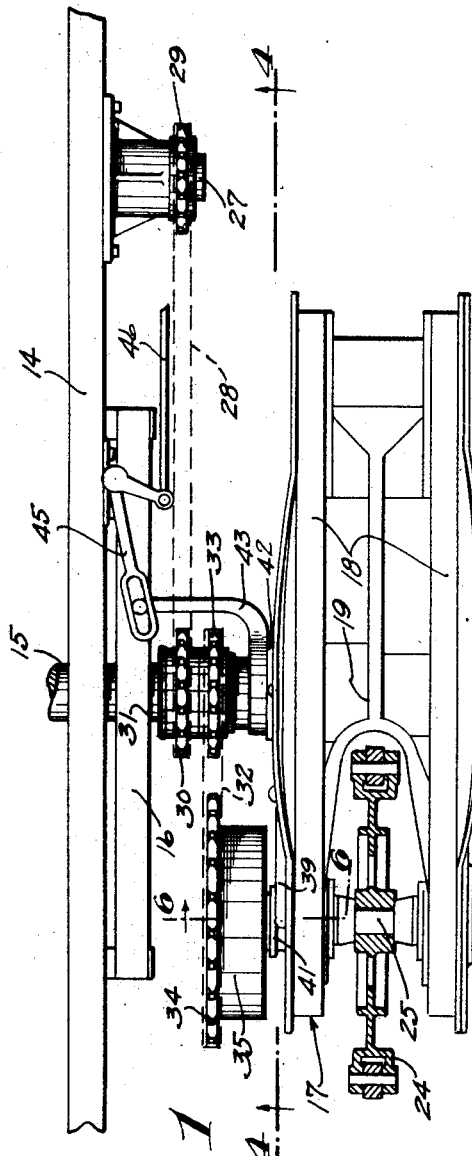
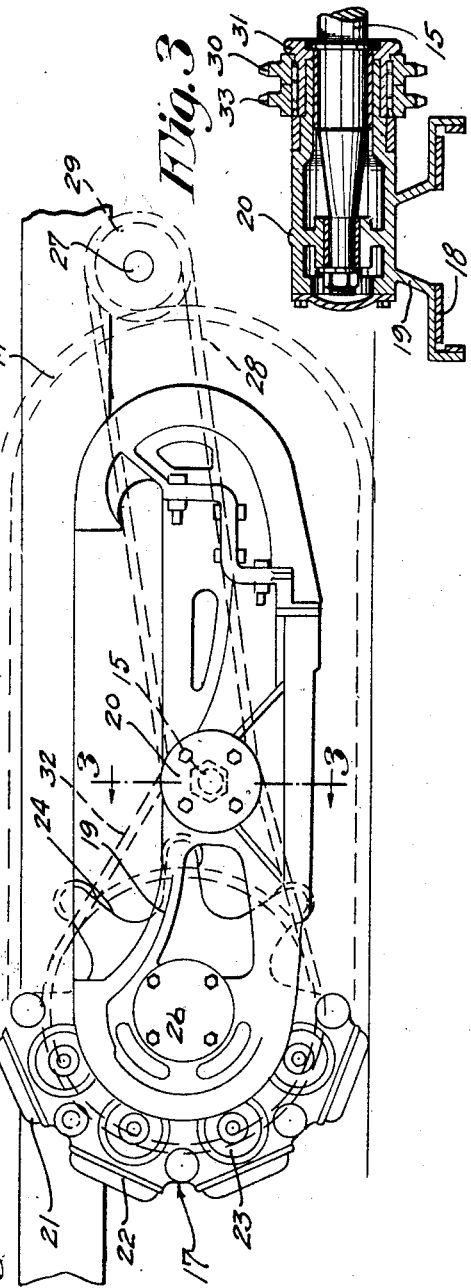
Inventor
Benjamin F. Pagenhart
By his Attorneys

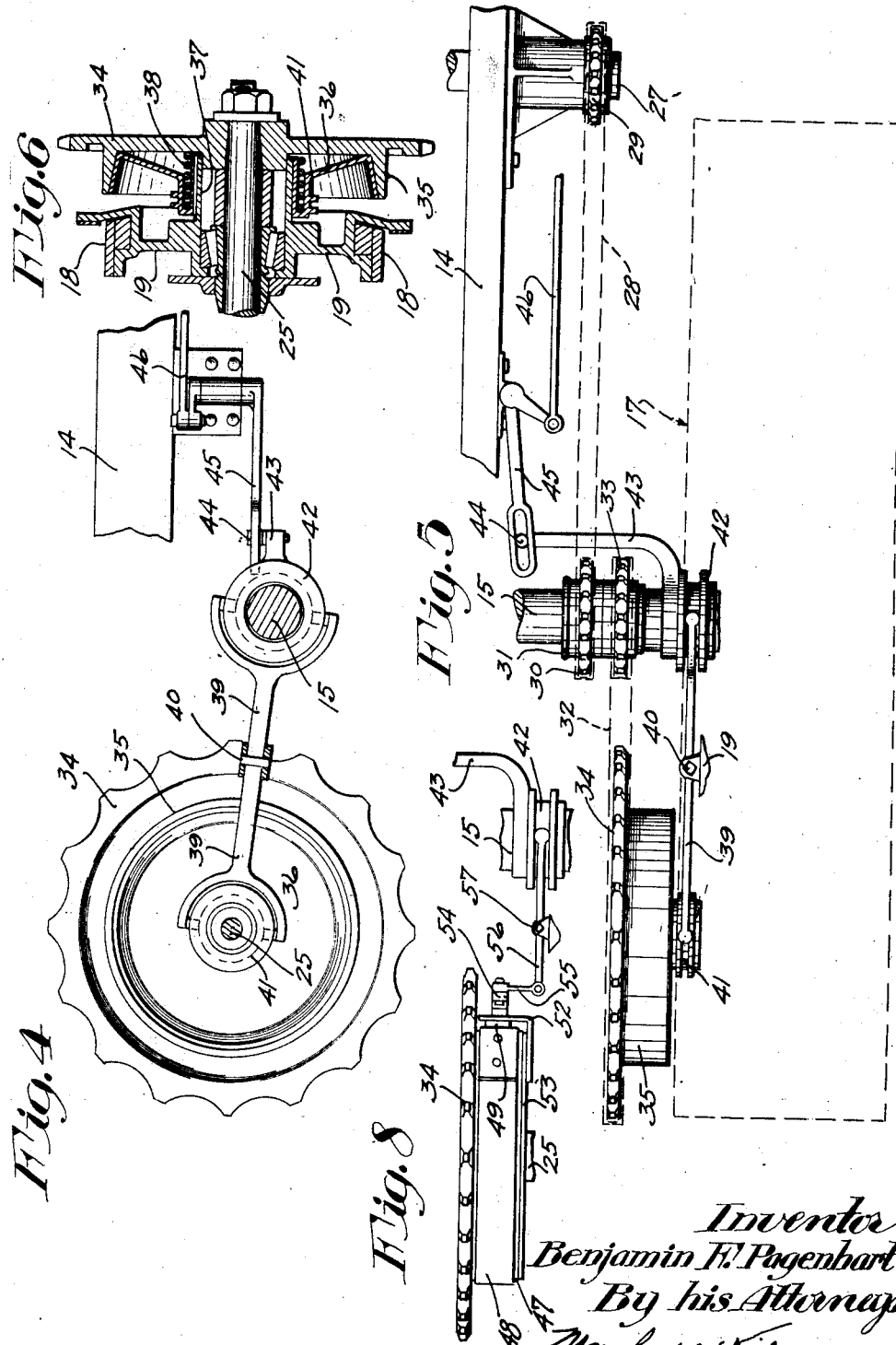

July 10, 1928.                                                  1,677,047
B. F. PAGENHART
BRAKE MECHANISM FOR TRACTION DEVICES OF THE ENDLESS BELT TYPE
Filed July 16, 1926            3 Sheets-Sheet 3
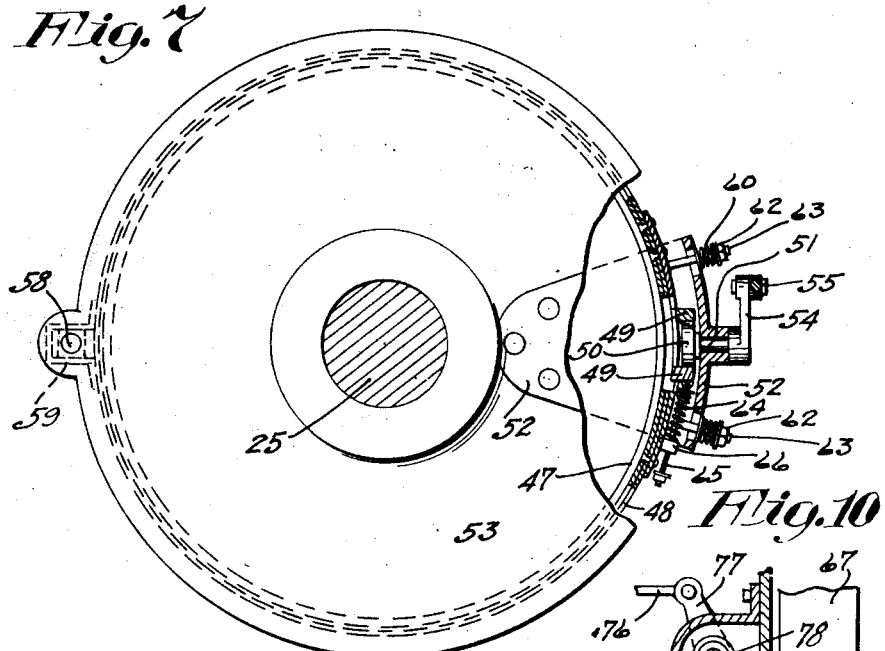
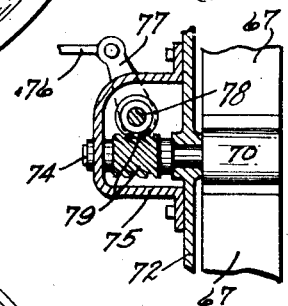
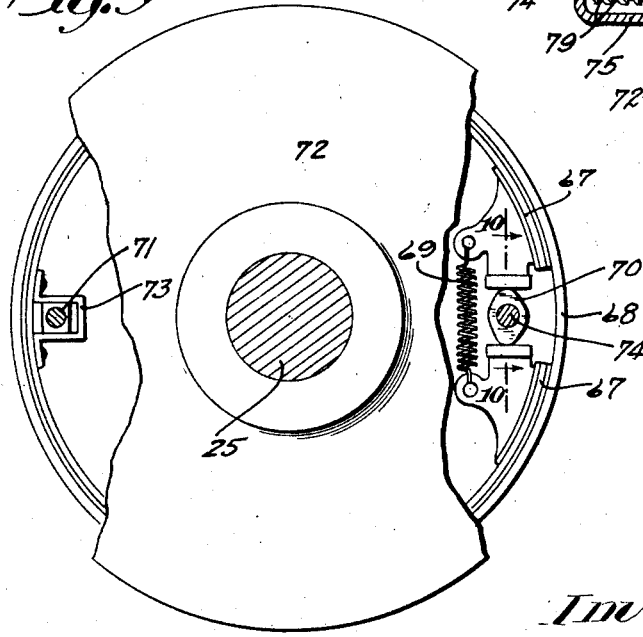
Inventor
Benjamin F. Pagenhart
By his Attorney
Merchant and Keegan Patented July 10, 1928.

1,677,047

UNITED STATES PATENT OFFICE.

BENJAMIN F. PAGENHART, OF MINNEAPOLIS, MINNESOTA, ASSIGNOR OF ONE-HALF TO THOMAS YOUNG, OF MINNEAPOLIS, MINNESOTA.

BRAKE MECHANISM FOR TRACTION DEVICES OF THE ENDLESS-BELT TYPE.

Application filed July 16, 1926. Serial No. 122,825.

My present invention has for its object to provide brake mechanism for traction devices of the endless belt type mounted for oscillatory movement and, more particularly, to such traction devices when applied to a motor-propelled truck to take the place of certain of the traction wheels.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary plan view of a motor-propelled truck and one of its traction devices, with some parts sectioned and other parts removed;

Fig. 2 is a side elevation of the same, with some parts diagrammatically illustrated by means of broken lines;

Fig. 3 is a view principally in transverse vertical section, taken on the line 3—3 of Fig. 2;

Fig. 4 is a fragmentary view partly in side elevation and partly in longitudinal central section, taken on the line 4—4 of Fig. 1;

Fig. 5 is a plan view of the parts shown in Fig. 4, with the traction device diagrammatically illustrated by means of broken lines;

Fig. 6 is a detail view in section taken on the line 6—6 of Fig. 1 on an enlarged scale;

Fig. 7 is a view in side elevation showing a slight modification of the brake-setting mechanism for operating an external brake member;

Fig. 8 is a plan view showing the connection between the shipper lever and external brake member shown in Fig. 7;

Fig. 9 is a view in side elevation showing another modification of the brake-setting mechanism for operating an internal brake member; and Fig. 10 is a detail view in section taken on the line 10—10 of Fig. 9.

Referring first to the invention as illustrated in Figs. 1 to 6, inclusive, the numeral 14 indicates the right-hand longitudinal side member of the frame of a motor-propelled truck, and the numeral 15 indicates the fixed rear axle from which said member is supported by a spring 16. The axle 15 is carried by a pair of traction devices of the endless belt type, only one of which is shown, and indicated as an entirety by the numeral 17. This traction device 17 includes an endless horizontally elongated track 18 comprising a pair of laterally spaced rails rigidly connected by a frame structure 19 with which is formed a hub 20 journaled on the rear axle 15. Said hub 20 is located within the endless track 18 slightly rearward of the longitudinal center thereof, and supports the traction device 17 for oscillatory movement in a vertical plane. An endless link belt 21, encircling the track 18 is provided with ground-engaging shoes 22 having rollers 23 arranged to travel on the rails of said track.

The belt 21 is driven by a roller-equipped sprocket wheel 24 keyed to a horizontal transverse shaft 25 journaled in bearings 26 formed in the frame structure 19 at the axis of the curved rear end of the track 18. The shaft 25 is driven from the engine of the truck, not shown, by connections, only parts of which are shown and of the parts shown the numeral 27 indicates a transverse shaft on the frame member 14, 28 a sprocket chain arranged to run over a sprocket wheel 29 on said shaft and an idle sprocket wheel 30 keyed to the sleeve 31 loosely journaled on the hub 20, 32 a sprocket chain arranged to run over an idle sprocket wheel 33 keyed to the sleeve 31, and 34 a sprocket wheel keyed to the inner end of the shaft 25. The sprocket chains 28 and 32 are indicated diagrammatically in Figs. 1 and 2 by means of broken lines. The parts thus far described are of standard construction.

Up to the present time, an effective brake mechanism has not been provided for a traction device of the endless belt type mounted to oscillate on a bearing therefor, for the reason that the parts of the traction device, to which brake mechanism may be effectively applied, are constantly changing their positions.

Within the brake drum 35 is an internal axially movable conical brake member 36 mounted for axial sliding movement on a sleeve 37 formed with the frame member 19 and keyed thereto against rotation. This conical brake member 36 is arranged for contact with the conical braking surface in the drum 35, and a coiled spring 38, compressed between the brake member 36 and sprocket wheel, normally holds said brake member released. To move the brake member 36 axially against the tension of the spring 38 to release the same, there is provided a shipper lever 39 intermediately fulcrumed at 40 to the frame member 19. It is important to note that this lever 39 extends radially from the axis of the axle 15 to the axis of the shaft 25 and each end thereof is forked. The rear forked end of the shipper lever 39 is connected to a shipper lever 41 on the hub of the brake member 36 and the front forked end of said lever is connected to a shipper collar 42 mounted on the axle 15 for axial sliding movement. Obviously, during the oscillatory movement of the traction device 17 on the axle 15, the front forked end of the shipper lever 39 is free to shift circumferentially about the axis of said axle.

Formed with the shipper collar 42 is an arm 43 that projects inward parallel to the axis of the axle 15 and is provided with an upstanding roller-equipped stud 44. Mounted on the frame member 14 is a bell crank 45 having a long arm with a longitudinal slot into which the roller-equipped stud 44 extends. A link 46 is attached to the short arm of the bell crank 45 for operating the same, and which link may be operated by a latch lever or other suitable device. Obviously, a rearward movement of the link 46, acting through the bell crank 45, will move the shipper collar 42 axially outward on the axle 15 and thereby operate the lever 39 to set the clutch member 36 onto the braking surface of the brake drum 35 against the tension of the spring 38.

Referring now to the modification shown in Figs. 7 and 8, in which the brake-setting mechanism is arranged to operate an external brake member, the numeral 47 indicates a brake drum on the shaft 25, having an external braking surface to which is applied a transversely divided brake band 48. Said brake band 48 has its ends overlapped and provided with outstanding lugs 49 between which is mounted a cam block 50 for contracting said band. The cam block 50 is carried by a shaft 51 journaled in a bearing formed in an L-shaped bracket 52 rigidly secured to a cover plate 53, which, in turn, is rigidly secured to the frame structure 19. A crank arm 54 on the outer end of the shaft 52 is connected by a link 55 to the rear end of a shipper lever 56, which corresponds to the shipper lever 39. This lever 56 is intermediately fulcrumed at 57 to the frame structure 19 and its front end is forked and connected to the shipper collar 42 for shifting movement about the axis of the axle 15 during the oscillatory movement of the traction device on the axle 15.

A block-equipped stud 58, anchored to the cover plate 53 and a cooperating yoke 59 on the brake band 48, anchors said band against rotation. Coiled springs 60, for yieldingly holding the brake band 48 centered in respect to the brake drum 47 and out of engagement therewith, are compressd between the bracket 52 and nuts 62 on studs 63, which extend through apertures in said bracket and are anchored to the end portions of the brake band 48. The brake band 48 is normally held expanded and out of contact with the braking surface of the brake drum 47 by a coiled spring 64 encircling a rod 65 hinged to one of the lugs 49 and compressed between a shoulder on said rod and an apertured lug 66 on the brake band 48 through which said rod loosely works.

In the modification shown in Figs. 9 and 10, the brake-setting mechanism is designed for use in connection with a transversely divided internal brake band 67 arranged to be expanded onto the internal braking surface of a brake drum 68 on the shaft 25. A coiled spring 69 is under strain to contract the brake band 67, and a cam lug 70 is mounted between the ends of said band for expanding the same onto the braking surface of the drum 68. This brake band 67 is held against rotation by a block-equipped stud 71 anchored to a cover plate 72 for said brake drum and a cooperating yoke 73 on said brake band. The cover plate 72 is rigidly secured to the frame structure 19. The cam block 70 is carried by a shaft 74 journaled in the cover plate 72 and a housing 75 on said plate.

A link 76, corresponding to the link 55, is provided for operating the cam block 70 and is pivoted to a crank arm 77 on a shaft 78 journaled in the housing 75 and connected to the shaft 74 by a pair of skew gears 79. Obviously, by operating the link 76 from a shipper lever corresponding to the lever 56, the cam block 70 may be operated to expand the brake band 67 onto the brake drum 68.

What I claim is:

1. The combination with a motor-propelled vehicle having an axle and a traction device comprising a track mounted to oscillate about the axis of the axle, an endless belt mounted on the track and having ground-engaging elements and power means including a wheel for driving the belt, said wheel being journaled on a part carried by the track with its axis parallel to the axle and radially spaced therefrom, of brake mechanism for the belt operative through the wheel and including cooperating brake members, one of which is secured for common rotation with the wheel and the other of which is anchored in respect to said rotative member, and brake-setting mechanism including a member for operating the anchored brake member and extending between the axle and the anchored brake member and arranged to shift about the axis of the axle under the oscillatory movement of the track.

2. The structure defined in claim 1 in which said member of the brake-setting mechanism is self-adjusting and mounted on a part carried by the track.

3. The structure defined in claim 1 in which said member of the brake-setting mechanism is self-adjusting and intermediately fulcrumed on a part carried by the track.

4. The structure defined in claim 1 in which said member of the brake-setting mechanism is self-adjusting and intermediately fulcrumed on a part carried by the track, and in which the brake-setting mechanism further includes an axially movable member on the axle to which the respective end of the intermediately fulcrumed member is connected.

5. The structure defined in claim 1 in which said member of the brake-setting mechanism is self-adjusting and intermediately fulcrumed on a part carried by the track, and in which the brake-setting mechanism further includes an axially movable member on the axle to which the respective end of the intermediately fulcrumed member is connected, and an operating connection having a slip joint with the axially movable member on the axle.

6. The combination with a motor-propelled vehicle having an axle and a traction device comprising a track mounted to oscillate about the axis of the axle, an endless belt mounted on the track and having ground-engaging elements and power means including a wheel for driving the belt, said wheels being journaled on a part carried by the track with its axis parallel to the axle and radially spaced therefrom, of brake mechanism for the belt operative through the wheel and including cooperating brake members, one of which is secured for common rotation with the wheel and the other of which is anchored in respect to said rotative member but free to move axially, and brake-setting mechanism including a shipper collar on the anchored brake member, and a shipper lever intermediately fulcrumed on a part carried by the track with one of its ends engaging the shipper collar, said lever being arranged to shift about the axis of the axle.

7. The structure defined in claim 6 in which the brake-setting mechanism further includes a second shipper collar mounted on the axle for axial movement and with which the respective end of the shipper lever engages.

8. The structure defined in claim 6 in which the brake-setting mechanism further includes a second shipper collar mounted on the axle for axial movement and with which the respective end of the shipper lever engages, and an operating connection having a slip joint with the shipper collar on the axle.

In testimony whereof I affix my signature.

BENJAMIN F. PAGENHART.